(12) United States Patent
Chiao

(10) Patent No.: US 6,472,467 B1
(45) Date of Patent: Oct. 29, 2002

(54) INORGANIC/ORGANIC COMPOSITIONS

(75) Inventor: Yi-Hung Chiao, Midland, MI (US)

(73) Assignee: Dow Global Technologies Inc., Midland, MI (US)

(*) Notice: Subject to any disclaimer, the term of this patent is extended or adjusted under 35 U.S.C. 154(b) by 0 days.

(21) Appl. No.: 09/422,573

(22) Filed: Oct. 21, 1999

(51) Int. Cl.⁷ .............................................. C08K 5/06
(52) U.S. Cl. ................. 524/755; 524/765; 524/770; 524/783; 524/786; 524/787
(58) Field of Search .......................... 524/755, 765, 524/770, 783, 786, 789

(56) References Cited

U.S. PATENT DOCUMENTS

| | | | |
|---|---|---|---|
| 3,856,606 A | 12/1974 | Fan et al. ............... 156/329 |
| 3,986,997 A | 10/1976 | Clark ..................... 260/29.2 |
| 3,997,501 A | 12/1976 | McLeod .................. 260/37 |
| 4,049,861 A | 9/1977 | Nozari .................... 428/220 |
| 4,316,744 A | 2/1982 | Bergna |
| 4,384,056 A | 5/1983 | Schmidt et al. |
| 4,405,679 A | 9/1983 | Fujioka et al. |
| 4,451,388 A | 5/1984 | Payne ..................... 252/313 |
| 4,477,499 A | 10/1984 | Doin et al. |
| 4,547,546 A | 10/1985 | Wells |
| 4,559,271 A | 12/1985 | Doin et al. |
| 4,644,988 A | 2/1987 | Ahmad et al. |
| 4,731,264 A | 3/1988 | Lin et al. ................ 427/387 |
| 5,023,140 A | 6/1991 | Glotfelter et al. ....... 428/413 |
| 5,114,738 A | 5/1992 | Savage et al. ........... 427/37 |
| 5,120,811 A | 6/1992 | Glotfelter et al. ....... 528/25 |
| 5,147,921 A | 9/1992 | Mallo |
| 5,182,143 A | 1/1993 | Holmes-Farley et al. ... 427/409 |
| 5,232,783 A | 8/1993 | Pawar et al. ............ 428/429 |
| 5,232,964 A | 8/1993 | Evans et al. ............ 524/94 |
| 5,242,774 A | 9/1993 | Odell et al. ............. 430/59 |
| 5,260,350 A | 11/1993 | Wright ................... 522/42 |
| 5,275,645 A | 1/1994 | Ternoir et al. .......... 106/2 |
| 5,314,980 A | 5/1994 | Morrison ................ 528/19 |
| 5,364,693 A | 11/1994 | Moren et al. ........... 428/263 |
| 5,374,483 A | 12/1994 | Wright ................... 428/412 |
| 5,385,964 A | 1/1995 | Basil et al. ............. 524/266 |
| 5,395,697 A | 3/1995 | Morrison ................ 428/412 |
| 5,409,778 A | 4/1995 | Patel ..................... 428/412 |
| 5,409,980 A | 4/1995 | Myszak, Jr. |
| 5,414,093 A | 5/1995 | Wolter ................... 549/214 |
| 5,438,109 A | 8/1995 | Nugent, Jr. et al. ..... 525/526 |
| 5,439,624 A | 8/1995 | Anderson et al. ....... 264/66 |
| 5,449,553 A | 9/1995 | Griffith ................. 428/332 |
| 5,466,533 A | 11/1995 | Fitzgerald et al. ...... 428/447 |
| 5,480,725 A | 1/1996 | Fitzgerald et al. ...... 428/447 |
| 5,639,412 A | 6/1997 | Anderson et al. ....... 252/313.2 |
| 5,705,222 A | 1/1998 | Somasundaran et al. ... 427/320 |
| 5,712,037 A | 1/1998 | Anderson et al. ....... 428/404 |
| 5,716,679 A | 2/1998 | Krug et al. ............. 427/515 |
| 5,731,091 A | 3/1998 | Schmidt et al. ......... 428/428 |
| 5,853,809 A | 12/1998 | Campbell et al. ....... 427/407.1 |
| 5,877,251 A | 3/1999 | Sant |
| 5,914,162 A | 6/1999 | Bilkadi |
| 6,086,792 A | 7/2000 | Reid et al. |

FOREIGN PATENT DOCUMENTS

| | | |
|---|---|---|
| DE | 195 40 623 A1 | 5/1997 |
| EP | 0 157 030 B1 | 7/1989 |
| EP | 0 614 957 A1 | 9/1994 |
| EP | 0 940 452 A1 | 9/1999 |
| GB | 2 068 010 A | 8/1981 |
| WO | WO 80/00940 | 5/1980 |

OTHER PUBLICATIONS

Derwent Abstract, 97–427219/40, "Composite Systems With High Barrier Properties—Comprise Base Film Coated With Barrier Layers Containing Inorganic–Organic Hybrid Polymers and Other Layers of Base Material of Other Barrier Material", Ger. (1998).

American Chemical Society, "Organically Modified Silicates as Inorganic–Organic Polymers", H. K. Schmidt, Chapter 27, pp. 333–344 (1988).

Inorganic and Organometallic Polymers With Special Properties, "Organically Modified Silicates as Inorganic–Organic Polymers", H. K. Schmidt, pp. 297–317 (1992).

Journal of Sol–Gel Science and Technology, "Organically Modified Silicates and Ceramics as Two–Phasic Systems: Synthesis and Processing", H. K. Schmidt, pp. 557–565 (1997).

Mat. Res. Soc. Symp. Proc., "Organically Modified Silicates by the Sol–Gel Process", H. Schmidt, vol. 32, pp. 327–335 (1984).

Mat. Res. Soc. Symp. Proc., "A New Type of a Sol–Gel–Derived Inorganic–Organic Nanocomposite", R. Kasemann, et al., vol. 346, pp. 915–921 (1994).

Fine Particle Technology News, "BASF Adds Particles to Auto Clearcoat", vol. 2, No. 1, pp. 1–2 (Feb. 1999).

"Development of Organic–Inorganic Hard Coatings by the Sol–Gel Process", H. Schmidt, et al., Chapter 48, pp. 651–660.

(List continued on next page.)

Primary Examiner—Edward J. Cain

(57) ABSTRACT

Coating solutions comprising a) a solvent, b) inorganic particles dispersed substantially uniformly in the solution, c) an inorganic surface modifier dispersed substantially uniformly in the solution, and d) an organic cross-linker dispersed substantially uniformly in the solution. The inorganic surface modifier comprises from about 1 to about 30 weight percent of b) and c). Together, b) and c) comprise from about 30 weight percent to about 75 weight percent of b), c), and d). Solutions of the present invention can be applied to a variety of substrates to produce coatings that are highly abrasion-resistant. Coatings of the present inventions also exhibit good oxygen and water vapor barrier properties. Solutions of the present invention can also be utilized to produce three-dimensional objects.

15 Claims, No Drawings

OTHER PUBLICATIONS

Journal of the Ceramic Society of Japan, "Sol–Gel Optics", Mackenzie, et al., pp. 1–10 (1993).

Journal of Sol–Gel Science and Technology, "Abrasion Resistant Inorganic/Organic Coating Materials Prepared by the Sol–Gel Method", J. Wen, et al., vol. 5, pp. 115–126 (1995).

Mat. Res. Soc. Symp. Proc., "Hybrid Sols as Intermediates to Inorganic–Organic Nanocomposites", H. K. Schmidt, et al., vol. 435, pp. 13–24 (1996).

Advanced Materials & Processes, "Sol–Gel Method Yields Thicker Ceramic Coatings", D. Barrow, pp. 35 (4/1998).

Patent Abstracts of Japan, vol. 009, No. 170, (P–373) Jul. 16, 1985 & JP 60046501 A (Suwa Seikosha KK), Mar. 13, 1985 Abstract.

INORGANIC/ORGANIC COMPOSITIONS

The present invention relates generally to the art of hard coatings. More specifically, the present invention relates to novel hard coatings produced from novel storage-stable solutions containing two different inorganic components plus a third component, which contains cross-linkable organic functionality.

BACKGROUND OF THE INVENTION

For purposes of the present specification, a hard coating will refer to a coating that exhibits good mechanical properties, such as scratch-resistance and abrasion-resistance. There are many different approaches known in the art for producing hard coatings. These hard coatings are utilized in many different applications. For example, hard coatings are often used to protect furniture, as well as to protect various parts of an automobile.

It is known in the art to produce hard coatings using sol-gel processes and techniques. It is also known that the formation of dense, pure inorganic coatings by the sol-gel route requires heating. The amount of heat necessary to produce dense, pure inorganic coatings makes it prohibitive to coat certain materials, such as plastic substrates. Additionally, pure inorganic coatings are brittle due to their high (three-dimensional) inorganic network connectivity.

The introduction of organic components to sol-gel compositions can lead to a reduction of overall inorganic network connectivity in coatings and allow coatings to be produced at lower temperatures. Also, the inclusion of organic components allows coatings to be more flexible viscoelastic (that is, less brittle) while maintaining good scratch resistance and abrasion resistance. Some of these inorganic/organic coatings have become known as ormosils (organically modified silicates), ormocer (organically modified ceramics), or nanomers (nanoparticle and organic component containing polymer type materials).

However, up to now these inorganic/organic coatings have suffered from a number of deficiencies. First, it has been extremely difficult, if not impossible in some cases, to produce coatings having an inorganic portion greater than about 40 percent. Coatings having less inorganic content will have insufficient abrasion resistance or insufficient scratch resistance for many applications. Second, the inorganic/organic coating compositions of the prior art are either sensitive to water or immiscible in water, requiring organic solvents that may be expensive, difficult, or even hazardous to use.

Accordingly, there exists a need in the industry for hard coatings that can be easily and economically produced at low temperatures. The present invention addresses these concerns.

SUMMARY OF THE INVENTION

In one aspect, the present invention is a storage-stable solution that can be easily utilized to produce hard coatings. Solutions of the present invention comprise a) a solvent; b) inorganic particles dispersed substantially uniformly in the solution, said particles having a size of from about 1 nanometer to about 100 nanometers; c) an inorganic surface modifier dispersed substantially uniformly in the solution, the weight percent of said modifier comprising from about 1 percent to about 30 percent of the total weight of b) and c); and d) an organic cross-linker dispersed substantially uniformly in the solution; wherein b) and c) together constitute from about 30 weight percent to about 70 weight percent of b), c), and d).

In one preferred embodiment, solutions of the present invention are aqueous. Although other solvents may be used in solutions of the present invention to produce coatings of the present invention, an important advantage of the present invention is that solutions of the present invention can be produced using only water as a solvent.

The components in solutions of the present invention can be mixed in a variety of ways known in the art. A preferred method for mixing the components is to first prepare a solution containing the inorganic surface modifier in the solvent and then add the organic cross-linker, or a solution containing the cross-linker, to the solution containing the surface modifier. Next, this solution containing the inorganic surface modifier and the organic cross-linker is added to a sol containing the inorganic particles.

The method of producing coatings from solutions of the present invention is not particularly critical. The solution is first applied to a substrate to be coated and then the solution is cured to produce the coating. Solutions of the present invention are cured in one of two ways depending on whether the solvent present needs to be removed or whether the solvent is a reactable solvent. The first method of curing is to first remove the solvent and then apply appropriate stimulus (for example, heat or UV light) to cross-link or polymerize the organic cross-linker. The second method of curing solutions of the present invention, used when a reactable solvent is present, is to react the solvent, instead of removing it, and cross-link or polymerize the organic cross-linker by applying appropriate stimulus.

A preferred method for curing solutions of the present invention, especially aqueous solutions, is to apply sufficient heat to the solution to remove the solvent and promote the cross-linking. Generally, solutions of the present invention can be cured at a temperature that is sufficiently low to allow solutions of the present invention to be cured on plastic substrates, such as substrates made of polycarbonate, PET, PEN, PVC, PMMA, polyolefins, polysulfone, and polyurethane.

In yet another aspect, the present invention is a novel composition that can be utilized as an abrasion-resistant coating. Compositions of the present invention comprise a) inorganic particles dispersed substantially uniformly throughout the composition, said particles having a size of from about 1 nanometer to about 100 nanometers, said inorganic particles comprising from about 30 volume percent to about 70 volume percent of the composition volume; b) inorganic modifier particulates dispersed substantially uniformly throughout the composition, said modifier particulates having a size ratio relative to the size of said inorganic particles of from about 1:50 to about 1:2, said modifier particulates comprising from about 1 volume percent to about 20 volume percent of the composition volume); and c) a cross-linked organic component comprising from about 10 volume percent to about 70 volume percent of the composition volume.

DETAILED DESCRIPTION OF THE INVENTION

Solutions and coatings of the present invention contain at least two different inorganic components and at least a third component, which contains cross-linkable organic functionality. For purposes of this specification, this third component will be referred to as an organic cross-linker. The cross-linker may not be entirely organic, but is at least partially organic in nature. Thus, solutions and coatings of the present invention may be considered dual-phase in the sense that they contain both inorganic components (that is, an inorganic phase) and an organic component (that is, an organic phase). Coatings of the present invention may be considered bimodal in the sense that the two inorganic components are of differing size. In addition to the inorganic components and the organic cross-linker, solutions of the present invention also comprise a solvent.

Solutions of the present invention are storage-stable. By storage-stable, it is meant that solutions of the present invention can be put in storage for periods of days or even months and then utilized without additional preparation (such as remixing).

There are two types of solvents that are useful in solutions of the present invention. The first type of solvent acts as a carrier medium for the other solution components and must be removed from solutions of the present invention during the process of producing a coating from these solutions. Solvents of the first type that are useful in solutions of the present invention include water, organic solvents, and mixtures thereof. Preferred solvents are water, alcohols, ketones, glycol ethers, glycol esters, and mixtures of these. A particularly preferred solvent is water. In fact, it is a particularly advantageous aspect of the present invention that solutions and coatings of the present invention can be produced utilizing water as the only solvent.

The second type of solvent useful in solutions of the present invention are solvents that do not have to be removed from solutions of the present invention during the process of producing a coating from these solutions. For purposes of this specification, these solvents will be referred to as reactable solvents. Instead of being removed from solution, these reactable solvents undergo a cross-linking or polymerization reaction. One advantage of using these reactable solvents is that, in some embodiments of the present invention, the same stimulus used to initiate cross-linking or polymerization in the cross-linker can be used to initiate the reaction of the solvent as well. In this manner, coatings can be produced from solutions of the present invention utilizing these reactable solvents in a single step. Typically, the stimulus to initiate the reaction of both the organic cross-linker and the solvent is the application of UV light or electron beam.

Examples of reactable solvents useful in solutions of the present invention include epoxies, acrylates, and vinyl ethers. Preferred examples include cycloaliphatic epoxies, epoxy acrylates, and urethane acrylates.

The amount of solvent needed for solutions of the present invention is not particularly critical. There must be sufficient solvent present in the solution to allow the other components present to be dispersed substantially uniformly in the solution.

Generally, in solutions of the present invention, the solvent comprises at least about 10 weight percent and no more than about 90 weight percent of the solution. Typically, the solvent comprises at least about 25 weight percent and no more than about 75 weight percent of the solution. Within the limits discussed above, the amount of solvent present in solutions of the present invention can be adjusted to produce a solution having a desired viscosity without significantly affecting the chemical nature of the resulting coating to be produced.

The inorganic phase in solutions of the present invention comprises two different inorganic components: inorganic surface modifiers, which take a particulate form in coatings of the present invention, and inorganic particles. Preferably, these inorganic particles and the inorganic modifier particulates discussed below are approximately spherical in shape. Unless stated otherwise in the present specification, a reference to the size of inorganic particles or particulates used in the present invention will refer to the average diameter of the particles or particulates.

The first inorganic component comprises inorganic particles ranging in size from about 1 nanometer to about 100 nanometers. Particles having a density higher than the solvent and a size larger than about 100 nanometers will tend to settle out of low viscosity solutions when stored for longer periods of time. Thus, inorganic particles used in the present invention must have a size less than about 100 nanometers or the resulting solution may not be sedimentation-free during storage (that is, not storage stable).

If clear coatings are desired, the inorganic particles should have a size of less than about 50 nanometers. Preferred inorganic particles will have a size of no more than about 40 nanometers. More preferably, inorganic particles used in the present invention will have a size of no more than about 30 nanometers.

Generally, for coatings of the present invention to have adequate mechanical properties, such as good scratch resistance and good abrasion resistance, the inorganic particles used must have a size of at least one nanometer. Preferably, inorganic particles used in the present invention will have a size of at least about 5 nanometers.

Also, it is preferred to utilize particles that are substantially uniform in size. Although it is not necessary to have particles that are all precisely the same size, increased uniformity in the size of particles is preferred, especially when clarity of the resulting coatings is important for the desired application.

In solutions of the present invention, the inorganic particles should be dispersed substantially uniformly in solution. Uniform dispersion facilitates adequate mixing of all components and allows for production of uniform coatings.

Inorganic particles useful in embodiments of the present invention include both natural and synthetic ceramics, clays, minerals, metals, metal alloys, and mixtures of these. Examples of useful ceramics, clays, and minerals are oxides, hydroxides, carbides, borides, phosphides, titanates, tungstenates, nitrides, silicides, fluorides, sulfides, carbonates, and silicates. Preferred inorganic particles are those with an oxide or hydroxide surface. More preferred inorganic particles are utilized as oxide sols in solvent. It is particularly preferred to utilize inorganic particles in the form of aqueous sols of silica, alumina, aluminum hydroxide, ceria, titania, and zirconia.

The second component of the inorganic phase is an inorganic surface modifier. For purposes of the present specification, the term "surface modifier" is used because micrographs taken show that, in coatings of the present invention, the modifiers precipitate onto, adhere to, or bond to the surface of the inorganic particles.

The inorganic surface modifier should be dispersed substantially uniformly in solutions of the present invention. By dispersed substantially uniformly, it is meant that the surface modifiers are substantially uniformly distributed throughout the solution and mix with the other components of the solution. Preferably, the inorganic surface modifier is soluble in the solvent utilized. Surface modifiers that are soluble in the solvent disperse easily.

The surface modifier should constitute from about 1 percent to about 30 percent of the total weight of the inorganic phase (that is, the total combined weight of the inorganic particles and the surface modifier). Preferably the surface modifier will constitute from about 1 weight percent to about 20 weight percent of the inorganic phase.

Inorganic surface modifiers useful in the present invention may include species that react with the solvent to form nanometer scale sols or micelle suspensions in the solvent. For example, metal chlorides react with water to form metal hydroxide sols. Useful surface modifiers are those that can be made to precipitate onto the surfaces of the inorganic particles by processes, such as ion exchange, ion removal, changes in pH, changes in concentration of modifier, changes in temperature, changes in pressure, or by other physical, chemical, optical, or mechanical stimulation. A preferred method for causing the surface modifiers to precipitate onto the surfaces of the inorganic particles is the removal of the solvent from solutions of the present invention. Ion exchange techniques can also be utilized to precipitate modifiers onto the surfaces of the inorganic particles without the removal of solvent.

Inorganic surface modifiers useful in the present invention include inorganic salts, organometallic compounds, ceramic precursors, ceramics, clays, minerals, metals, metal alloys, or mixtures of these. Preferred surface modifiers for aqueous solutions are metal salts, such as aluminum chlorides, aluminum oxychlorides, and tin chlorides.

Organic cross-linkers useful in the present invention include organic compounds and organometallic compounds, and their oligomers, adducts, condensates, and reaction products, which can be dispersed substantially uniformly in solutions of the present invention. By dispersed substantially uniformly, it is meant that the organic cross-linkers are substantially uniformly distributed throughout the solution and mix with the other components of the solution. Preferably, organic cross-linkers useful in the present invention are soluble in the solvent utilized. The cross-linkers can become insoluble or otherwise non-dispersible in the solvent by changes in pH, changes in concentration of cross-linker, changes in temperature, changes in pressure, or by other physical, chemical, optical, irradiation, or mechanical stimulation.

Examples of useful organic cross-linkers are epoxides, acrylates, urethanes, vinyls, organosilanes, organotitanates, organophosphates, organosilanols, as well as these same compounds but having hydroxy, glycol, aminol, or phenolic functionalities. Preferred cross-linkers for aqueous solutions of the present invention are hydroxy functionalized silanol, acid hydrolyzed epoxy silanol, acid hydrolyzed epoxies, epoxy-amine adducts, hydroxy-containing acrylates, hydroxy-containing urethanes, hydroxy-containing epoxies, ethoxide-containing acrylates, ethoxide-containing urethanes, and ethoxide-containing epoxies.

The amount of organic cross-linker present in solutions of the present invention should be measured relative to the amount of inorganic phase (that is, inorganic particles plus inorganic surface modifiers) present and not measured relative to the total solution. The cross-linker should comprise no more than about 70 weight percent of the combined weights of the inorganic particles, the inorganic surface modifiers, and the organic cross-linker. Generally, the cross-linker will comprise at least about 25 weight percent of the combined weights of the inorganic particles, the inorganic surface modifiers, and the organic cross-linker.

Generally, the higher the percentages of inorganic phase (that is, less cross-linker) the more abrasion-resistant a resulting coating will be. Also, small inorganic particles will have more total surface area, requiring a higher percentage of organic cross-linker. Spherical shaped particles or particles with low aspect ratios are preferred for achieving high particle packing density in coatings of the present invention.

Certain inorganic materials; such as titania, ceria, iron oxide, chromic oxide, vanadium oxide; have ultraviolet ("UV") light scattering and absorption capability. By incorporating these materials into solutions of the present invention, coatings can be produced that provide protection (that is, UV blocking) to UV-sensitive substrates. The present invention offers unique advantages in allowing high loads of these UV-blocking inorganic materials to be uniformly distributed throughout coatings of the present invention.

Useful UV-blocking materials can be introduced in solutions and coatings of the present invention as the inorganic particles, as the inorganic surface modifiers, or as part of an organometallic cross-linker. For example, titania or ceria sols with particle size of 10–50 nanometers can be advantageously utilized in conjunction with an aluminum salt surface modifier to produce an inorganic phase useful in UV-blocking coatings. Other examples include using silica sols or titania sols and can be utilized in conjunction with a surface modifier comprising a cerium compound or cerium salt. Additionally, an organotitanate cross-linker can be advantageously utilized in UV-blocking coatings of the present invention.

Combinations of inorganic particles, surface modifiers, and cross-linkers can be used in a single coating or in multilayer sequential coatings to adjust, or optimize, the UV and visible light transmission characteristics, mechanical properties, and refraction index tailoring of coatings.

The components in solutions of the present invention can be mixed in a variety of ways known in the art. In fact, it is a unique advantage of the present invention that the components can be easily mixed and uniformly dispersed in solutions. It is a further advantage that the components can be easily mixed and uniformly dispersed in solutions of the present invention that are substantially, or even entirely, aqueous. The surface modifiers and cross-linkers can be dispersed in the solvent in four different ways: a) in solution form; b) in sol or micelle form; c) attached to the surface of the inorganic particles, forming a shell or partial shell around the inorganic particles; and d) combinations of a), b), and c). Once the components are mixed together, uniform dispersion of all components can be facilitated, if necessary, by subjecting solutions of the present invention to sonification, utilizing equipment such as a VibraCell 700 Watt ultrasonic horn (available from Sonics and Materials).

A preferred method for mixing the components is to first prepare a solution containing the inorganic surface modifier in the solvent and then add the organic cross-linker, or a solution containing the cross-linker, to the solution containing the surface modifier. Next, this solution containing the inorganic surface modifier and the organic cross-linker is added to a sol containing the inorganic particles.

The method of producing coatings from solutions of the present invention is not particularly critical. The solution is first applied to a substrate to be coated and then the solution is cured to produce the coating. Generally, solutions of the present invention can be cured at a temperature that is sufficiently low to allow solutions of the present invention to be cured on plastic substrates, such as substrates made of polycarbonate, PET, and PVC, polyolefins, and polyurethane.

Solutions of the present invention are cured in one of two ways depending on whether the solvent present needs to be removed or whether the solvent is a reactable solvent. The first method of curing is to first remove the solvent and then apply appropriate stimulus (for example, heat or UV light) to cause any cross-linkable moieties in the cross-linker (for example, epoxy functionality) to cross-link or polymerize. Examples of cross-linking or polymerization mechanisms include polycondensation or addition reaction mechanisms. A preferred method for curing solutions of the present invention, especially aqueous solutions, is to apply sufficient heat to the solution to remove the solvent and promote any cross-linking. The second method of curing solutions of the present invention, used when a reactable solvent is present, is to react the solvent, instead of removing it, and cross-link or polymerize the organic cross-linker by applying the appropriate stimulus. In preferred embodiments of the present invention, that same stimulus can be used to both react the solvent and to cross-link or polymerize the cross-linker.

Microscopy studies known in the art, such as transmission electron microscopy, were performed on solutions that were air dried or vacuum dried but not cross-linked. That is, these studies were performed on a coating that had the solvent removed but in which the organic cross-linker had not yet been cross-linked. The same studies were also performed on fully cured (that is, cross-linked or polymerized) coatings. These studies showed that the surface modifier appeared to form small particulates on the surface of the larger inorganic particles. These surface modifier particulates were dispersed substantially uniformly throughout the coatings.

The size of these surface modifier particulates is substantially less than the size of the inorganic particles utilized in the inorganic phase. The ratio of the size of the surface modifier particulates to the size of the inorganic particles is at least about 1:50, and preferably, at least about 1:15. The ratio of the size of the surface modifier particulates to the size of the inorganic particles is no more than about 1:2, and preferably, no more than about 1:5.

Coatings of the present invention also contain a cross-linked organic component. This component consists essentially of the organic cross-linker described above, but differing in that the cross-linkable or polymerizable moieties on the cross-linker have been cross-linked or polymerized by appropriate stimulus.

The components in coatings of the present invention "pack" tightly together. Thus, coatings of the present invention contain very little void space or air between the components in the coating. The amount of void space in coatings of the present invention can be estimated by one of ordinary skill in the art by examining micrographs of coatings. It is believed that the difference in size between the inorganic particles and the surface modifiers in coatings of the present invention may allow the inorganic phase to "pack" tighter, resulting in higher inorganic loading, and therefore, better scratch resistance and better abrasion resistance.

Void space will comprise less than about 20 percent of the volume of coatings of the present invention. Preferably, the total void space will comprise less than about 10 percent of the volume. More preferably, the total void space in coatings of the present invention will comprise less than about 5 volume percent of the total volume of coatings of the present invention.

In coatings of the present invention, the volume of the inorganic particles constitute from about 30 percent to about 70 percent of the total volume of the coatings. Preferably, the inorganic particles constitute from about 40 volume percent to about 70 volume percent. In coatings of the present invention, the volume of the inorganic modifier particulates constitute from about 1 percent to about 20 percent of the total volume of the coatings. In coatings of the present invention, the volume of the cross-linked organic component constitutes from about 10 percent to about 70 percent of the total volume of the coatings. Preferably, the cross-linked organic component constitutes from about 10 volume percent to about 50 volume percent.

One of the advantages of the present invention is that high loads of the inorganic phase can be achieved in coatings of the present invention. Unless stated otherwise in this specification, the "load" of inorganics will refer to the weight percent of the inorganic phase present in coatings of the present invention. The inorganic phase comprises at least about 30 percent by weight of coatings of the present invention.

Generally, coatings having higher loads of the inorganic phase will have better scratch and abrasion resistance than coatings having lower loads of the inorganic phase. Accordingly, in some preferred embodiments of coatings, the inorganic phase will comprise at least about 40 percent by weight, and preferably at least about 50 percent by weight. The inorganic phase may comprise up to about 75 percent by weight of the coating. Even higher inorganic loads can be achieved by using larger inorganic particles, but using larger particles may decrease solution stability and may decrease optical transmission of the resulting coatings.

Solutions and coatings of the present invention may include various additives so long as the additives are not included in amounts that substantially interfere with the function or effectiveness of the other components. One of ordinary skill in the art may choose different additives depending on a particular need for a particular application. Additives that one of ordinary skill in the art might consider incorporating into solutions and coatings of the present invention include surfactants, dispersants, adhesion promoters, leveling agents, pigments, dyes, latex, emulsion polymers, diluents, plasticizers, fillers, thickeners, defoaming agents, coupling agents, catalysts, blocking agents, hardeners, curing agents, flow control agents, buffering agents, organic resins, fungicides, wetting agents, photoinitiators, UV absorbers, light stabilizers, antioxidants, co-activators, and extenders.

Solutions of the present invention can be advantageously utilized to coat many different substrates. For example, coatings of the present invention have been successfully produced on plastics, such as polycarbonate, PET, PVC, polyolefins, and polyurethane; metals, such as aluminum foil, brass, and iron; wood; and glass.

Coatings of the present invention can be used in applications requiring barrier properties. For example, coatings of the present invention were applied to PET substrates. The coated substrates exhibited dramatically lower oxygen and water vapor transmission rates (that is, higher barrier properties) than the same PET substrates without the coating.

While the present specification has focussed on the formation of coatings, it should be noted that solutions of the present invention can be advantageously utilized to form other articles. For example, solutions of the present invention can be utilized to form stand alone films. One method of forming a film would be to form a thick coating on a removable substrate and then remove the coating from the substrate. Additionally, solutions of the present invention can be utilized to from three dimensional objects by pouring the solution into a mold and then curing the solution.

Data

A number of different coatings were produced and tested for abrasion resistance. A glass surface was also tested for comparative purposes. Abrasion resistance was evaluated by measuring the haze of each coating before and after subjecting the coatings to abrasion tests. A smaller change in haze value indicates that a coating is more abrasion resistant, whereas a large change in haze value indicates lesser abrasion resistance. All haze measurements were obtained on a HunterLab UltraScan I unit following procedures according to ASTM 4060. Unless stated otherwise, all abrasion tests were carried out on a Taber Abraser using a CS-10F abrading wheel at an abrading load of 500 grams (that is, 1000 gram total weight evenly distributed on the two abrading wheels) for 1000 abrading cycles.

Samples 1–4 below were all prepared so that the solutions prepared comprised 15 weight percent inorganic phase, 25 weight percent cross-linker, and 60 weight percent solvent. Samples 1–4 differed only in the composition of the inorganic phases. In all four samples, the cross-linker used was 3-glycidoxypropyltrimethoxy-silane (available as Z-6040 from Dow Corning). In all four samples, the solvent used was water.

Coatings were made from all four samples and evaluated for abrasion resistance using haze measurements as indicated above. The results of the abrasion resistance testing are shown in Table I.

SAMPLE 1

An alumina sol (available as stock No.12733 from Alpha) was used to provide the inorganic phase. The alumina sol was a 20 weight percent colloidal suspension in water, having a pH of 4.0, a particle size of 50 nanometers, and a positive particle charge. The alumina sol was mixed with 3-glycidoxypropyl-trimethoxysilane and water. The mixture was sonicated for 2.5 minutes using a VibraCell 700 Watt ultrasonic horn (available from Sonics and Materials), at a 30 percent amplitude setting. The mixture was then allowed to stand at room temperature for 2.5 hours without additional stirring.

The mixture was then applied to corona-treated polycarbonate substrates using a spin coater (available from Headway Research) at 900 rpm for 1 minute. After the spin coating, the coating was cured by heating the coated substrates in a Thelco oven at 120° C. for 45 minutes. The coated substrates were then air cooled to room temperature.

The coated substrates were measured for haze. The haze was measured at 0.43 percent. Next, the coated samples were subjected to abrasion tests. Haze was again measured from at least 4 different spots on the wear track produced by the abrasion testing. The haze measurements were averaged and used for comparison. The average haze measurement after abrasion testing was 19.80 percent.

SAMPLE 2

Compositions and coatings were prepared in the same manner as Sample 1 except that a silica sol (available as Ludox-TMA from DuPont) was used in place of the alumina sol. The silica sol was a 34 percent colloidal suspension in water, having a pH from 4 to 7, a particle size of 22 nanometers, a specific surface area of 140 m$^2$/g, and a negative particle charge.

Haze measurements were taken for Sample 2 coatings in the same manner as the haze measurements for Sample 1. The haze measurement prior to abrasion testing was 0.52 percent and the haze measurement after abrasion testing was 19.61 percent.

SAMPLE 3

Compositions and coatings were prepared in the same manner as Sample 2, except that instead of using only a silica sol to provide the inorganic phase, the inorganic phase was provided using a mixture of the same silica sol used in Sample 2 and an aluminum salt. The aluminum salt was aluminum chloride hexahydrate (available from Aldrich). While the total inorganic phase remained 15 weight percent of the overall composition, 95 weight percent of the inorganic phase was provided by the silica sol and 5 weight percent (calculated as $AlO_{1.5}$) of the inorganic phase was provided by the aluminum chloride hexahydrate.

Haze measurements were taken for Sample 3 coatings in the same manner as the haze measurements for Sample 2. The haze measurement prior to abrasion testing was 0.40 percent and the haze measurement after abrasion testing was 3.85 percent.

SAMPLE 4

Compositions and coatings were prepared in the same manner as Sample 3, except that a mixture of aluminum nitrate and the same silica sol was used to provide the inorganic phase. The aluminum nitrate is available as aluminum nitrate nonahydrate from Aldrich. While the total inorganic phase remained at 15 weight percent of the overall composition, 95 weight percent of the inorganic phase was provided by the silica sol and 5 weight percent of the inorganic phase was provided by the aluminum nitrate.

Haze measurements were taken for Sample 4 coatings in the same manner as the haze measurements for Sample 3. The haze measurement prior to abrasion testing was 0.36 percent and the haze measurement after abrasion testing was 7.32 percent.

SAMPLE 5

One part by weight of the same aluminum salt used in Sample 3 was dissolved in 3 parts of deionized water at room temperature. Fifteen parts of the same cross-linker used in Sample 3 was mixed into the salt solution. Mixing was continued for about 5 minutes with heat release and the mixture turned clear. Thirty parts by weight of a silica sol (available as Ludox-Cl from DuPont) was added to the mixture, which brought the temperature down to close to ambient. The silica sol used was a 30 weight percent suspension in water, having a pH of 4.5, a particle size of 12 nanometers, a specific surface area of 230 m$^2$/g, and a positive particle charge. The mixture was then sonicated for 2.5 minutes as in Sample 3.

The resulting solution was applied to a corona treated polycarbonate substrate by spin coating at a spin rate of 800 rpm for 1 minute. The coated substrates were cured in the same manner as Sample 3.

Abrasion resistance was tested in the same manner as Sample 3 except that 2000 abrading cycles were used instead of 1000 abrading cycles. The haze measurement taken before abrasion testing was 0.40 percent and the haze measurement taken after abrasion testing was 2.66 percent.

GLASS SAMPLE

Glass samples of ⅛ inch (0.3173 cm) were abrasion tested in the same manner as Samples 1–4. The initial haze measurement was 0.09 percent and the haze measurement after abrasion testing was 1.34 percent.

TABLE I

|  | Haze Before Abrasion | Haze After Abrasion |
| --- | --- | --- |
| Glass Sample | 0.09% | 1.34% |
| Sample 1 | 0.43% | 19.80% |
| Sample 2 | 0.52% | 19.61% |
| Sample 3 | 0.40% | 3.83% |
| Sample 4 | 0.36% | 7.32% |
| Sample 5 | 0.40% | 2.66%* |

*Abrasion testing on Sample 5 was performed for 2000 abrading cycles, whereas abrasion testing for all other samples was performed for 1000 abrading cycles.

What is claimed is:

1. A solution comprising:
  a) water;
  b) inorganic particles dispersed substantially uniformly in the solution, said particles having a size of from about 1 nanometer to about 100 nanometers;
  c) an inorganic surface modifier dispersed substantially uniformly in the solution, the weight percent of said modifier comprising from about 1 percent to about 30 percent of the total weight of b) and c); and
  d) an organic cross-linker dispersed substantially uniformly in the solution, wherein b) and c) together constitute at least about 30 weight percent b), c), and d).

2. A solution according to claim 1, wherein said solvent is water.

3. A solution according to claim 1, wherein said inorganic particles are selected from the group consisting of particles having metal oxide surfaces and particles having metal hydroxide surfaces.

4. A solution according to claim 1, wherein said inorganic particles are selected from the group consisting of silica, alumina, aluminum hydroxide, ceria, titania, and zirconia.

5. A solution according to claim 1, wherein said inorganic surface modifier is selected from the group consisting of metal salts and organometallic compounds.

6. A solution according to claim 1, wherein said inorganic surface modifier is selected from the group consisting of aluminum chlorides, aluminum oxychlorides, and tin chlorides.

7. A solution according to claim 1, wherein said inorganic surface modifier is selected from the group consisting of hydroxy-containing monomers and hydroxy-containing oligomers.

8. A solution according to claim 1, wherein said organic cross-linker is selected from the group consisting of hydroxy functionalized silanol, acid hydrolyzed epoxies, and ethoxide-containing acrylates, urethanes, and epoxies.

9. A solution according to claim 1, wherein said inorganic particles have a size from about 1 nanometer to about 50 nanometers.

10. A solution according to claim 1, wherein said inorganic particles have a size from about 1 nanometer to about 40 nanometers.

11. A solution according to claim 1, wherein said inorganic particles have a size from about 1 nanometer to about 30 nanometers.

12. A solution according to claim 1, wherein said inorganic surface modifier is soluble in said solvent.

13. A solution according to claim 1, wherein said organic cross-linker is soluble in said solvent.

14. A solution according to claim 1, wherein said solvent is a reactable solvent.

15. A solution according to claim 1, wherein the weight percent of said modifier comprises from about 1 percent to about 20 percent of the total weight of b) and c).

* * * * *